United States Patent
Hamakawa et al.

[11] Patent Number: 5,805,553
[45] Date of Patent: Sep. 8, 1998

[54] HOLDER DEVICE AND HOLDER MOUNTING METHOD IN HOLDER DEVICE

[75] Inventors: Shinji Hamakawa; Kazuhito Kurita, both of Kanagawa, Japan

[73] Assignee: Sony Corporation, Tokyo, Japan

[21] Appl. No.: 851,144

[22] Filed: May 5, 1997

[30] Foreign Application Priority Data

May 13, 1996 [JP] Japan ................................ 8-117707

[51] Int. Cl.⁶ ............................................ G11B 33/02
[52] U.S. Cl. ........................................................ 369/75.2
[58] Field of Search ..................... 369/75.2, 77.1–77.2; 360/99.02, 99.06

[56] References Cited

U.S. PATENT DOCUMENTS

| | | | |
|---|---|---|---|
| 5,541,809 | 7/1996 | Kakizaki et al. | 369/75.2 |
| 5,590,098 | 12/1996 | Eom | 369/77.2 |
| 5,659,530 | 8/1997 | Kurita | 369/77.2 |

FOREIGN PATENT DOCUMENTS 58-208965  12/1983  Japan ..................................... 369/75.2

*Primary Examiner*—Allen T. Cao
*Attorney, Agent, or Firm*—Limbach & Limbach L.L.P.

[57] ABSTRACT

A holder device used in a disc recording and/or reproducing apparatus employing a disc cartridge includes a holder, a chassis and a supporting mechanism. The holder holds a disc cartridge and is rotatably mounted on the chassis. The supporting mechanism rotatably supports the holder relative to the chassis. The supporting mechanism includes a pair of shafts provided on one of the chassis and the holder and a pair of receiving portions having engagement holes engaged by the shafts. One of the receiving portions has a cut-out continuing with the engagement hole. The supporting mechanism is designed so that, after the other shaft of the pair of shafts is engaged in the other engagement hole of the pair of engagement holes, one shaft of the pair of shafts is engaged in one engagement hole of the pair of engagement holes via the cut-out for rotatably mounting the holder on the chassis.

10 Claims, 4 Drawing Sheets

HOLDER DEVICE AND HOLDER MOUNTING METHOD IN HOLDER DEVICE

BACKGROUND OF THE INVENTION

1. Field of the Invention

This invention relates to a holder device having a holder rotatably mounted on a chassis and a method for mounting a holder in the holder device.

2. Description of the Related Art

There is proposed a recording and/or reproducing apparatus employing a disc cartridge having rotatably enclosed therein a disc, such as an optical disc or a magneto-optical disc, adapted for recording or having recorded thereon information signals. This recording and/or reproducing apparatus is provided with a cartridge holder for holding a disc cartridge. This cartridge holder is mounted on a chassis so as to be rotated between the position of enabling insertion and detachment of the disc cartridge and the recording and/or reproducing position of recording and/or reproducing information signals for a disc accommodated in the disc cartridge held by the cartridge holder.

This cartridge holder is rotatably supported relative to the chassis by a rotational mechanism 100 comprised of a chassis 101 mounting a disc table 104 making up the disc rotating mechanism and a cartridge holder 102 adapted for holding the disc cartridge, as shown for example in FIG. 1. The cartridge holder 102 is rotated to an open position and to a closed position on loading the disc cartridge and after insertion of the disc cartridge, respectively. In the open position and in the closed position, the cartridge holder 102 is rotated upwards relative to the chassis 101 and in a direction to the closure position relative to the chassis 101, respectively.

The chassis 101 is in the form of a rectangle slightly larger in plan shape than the disc cartridge. At a mid portion of the chassis 101 is arranged a disc table 104 constituting the disc rotating mechanism along with a motor, not shown, and is designed for being rotated by the motor. At a corner on the back surface of the chassis 101 is mounted upright a supporting piece 105 rotatably supporting the holder. On a lateral side of the supporting piece 105 is protuberantly formed a supporting shaft 106.

The cartridge holder 102 has a top plate 107 facing the plane of the disc cartridge and a pair of sidewall sections 108a, 108b formed upright in the facing lateral sides of the top plate 107. The top plate 107 and the sidewall sections 108a, 108b make up a cartridge housing section 109. The top plate 107 and the sidewall sections 108a, 108b limit movement of the disc cartridge within the cartridge housing section 109. On one end of the sidewall sections 108a, 108b of the cartridge holder 102 are formed supporting pieces 110a, 110b. These supporting pieces 110a, 110b are formed with shaft inserting holes 111a, 111b, respectively.

On the opposite side corner on the back surface facing the supporting piece 105 of the chassis 101 is secured a supporting member 112 by a set screw 113. The supporting member 112 includes a mounting plate 115 formed with a tapped hole 114, a supporting plate 116 set upright on one end of the mounting plate 115 and a supporting shaft 117 protuberantly formed on a lateral side of the supporting plate 116. The supporting member 112, thus constructed, is secured by the supporting shaft 117 being passed through the shaft inserting hole 111b in the supporting piece 110b of the cartridge holder 102 and by a set screw 113 being threaded into the tapped hole 118 formed in the chassis 101 and in the tapped hole 114 formed in the supporting member 112.

In place of the rotating mechanism 100 of the cartridge holder, described above, there is proposed a rotary mechanism 120 of the cartridge holder shown in FIG. 2. This rotary mechanism 120 includes a chassis 121 and a cartridge holder 122 holding the disc cartridge. When loading the disc cartridge on the cartridge holder 122, the cartridge holder 122 is rotated upwards in a direction away from the chassis 121. After the end of loading of the disc cartridge on the cartridge holder 122, the cartridge holder 122 is rotated in the closure direction, that is in a direction in which the cartridge holder 122 approaches to the chassis 121.

The chassis 121 has a plan configuration slightly larger than that of the disc cartridge and has at a mid portion thereof a disc table 124 constituting the disc rotating mechanism. The chassis 121 has, on both sides on the back side thereof, a pair of supporting pieces 125a, 125b rotatably supporting the cartridge holder 122. On the lateral sides of the supporting pieces 125a, 125b are protuberantly formed supporting shafts 126a, 126b. The supporting shaft 126a is protuberantly formed for extending from the supporting piece 125a towards the inside of the chassis 121, while the opposite side supporting shaft 126b is protuberantly formed towards the outer side of the chassis 121 of the supporting piece 126b.

The cartridge holder 122 includes a top plate 127 facing the plane of the disc cartridge and a pair of sidewall sections 128a, 128b formed upright in the facing lateral sides of the top plate 127. The top plate 127 and the sidewall sections 128a, 128b make up a cartridge housing section 129. The top plate 127 and the sidewall sections 128a, 128b limit movement of the disc cartridge within the cartridge housing section 129. On one ends of the sidewall sections 128a, 128b of the cartridge holder 122 are formed supporting pieces 130a, 130b. These supporting pieces 130a, 130b are formed with shaft inserting holes 131a, 131b, respectively.

In the above-described rotary mechanism 120 of the cartridge holder 122, the supporting shafts 126a, 126b mounted on the supporting pieces 125a, 125b of the chassis 121 are passed through the shaft inserting holes 131a, 131b formed in the supporting pieces 130a, 130b of the cartridge holder 122. Then, a washer 133 is inserted on the foremost part of the shaft 126b for rotatably mounting the cartridge holder 122 on the supporting pieces 125a, 125b.

With the above-described rotary mechanism 100 or 120 of the cartridge holder 122, the supporting member 112 and the washer 133 are used as separate mounting members for mounting the cartridge holder 102 or 122 on the chassis 101 or 121. The result is that the operation of assembling the cartridge holder opening/closure mechanism 100 or 120 is time-consuming to render it difficult to improve the production efficiency. Since the cartridge holder rotary mechanism 100 or 120 uses the separate supporting member 112 and the washer 133 for mounting the cartridge holder 102 or 122 on the chassis 101 or 121, difficulties are met in stably mounting the cartridge holder 102 or 122 due to fluctuations in individual component parts.

SUMMARY OF THE INVENTION

It is therefore an object of the present invention to provide a holder device which resolves the above-mentioned problem.

The present invention provides a holder device used in a disc recording and/or reproducing apparatus employing a disc cartridge including a holder, a chassis and a supporting mechanism. The holder holds a disc cartridge and is rotatably mounted on the chassis. The supporting mechanism rotatably supports the holder relative to the chassis. The supporting mechanism includes a pair of shafts provided on one of the chassis and the holder and a pair of receiving portions having engagement holes engaged by the shafts. One of the receiving portions has a cut-out continuing with the engagement hole. The supporting mechanism is designed so that, after the other shaft of the pair of shafts is engaged in the other engagement hole of the pair of engagement holes, one shaft of the pair of shafts is engaged in one engagement hole of the pair of engagement holes via the cut-out for rotatably mounting the holder on the chassis.

The present invention also provides a method for mounting a holder in a holder apparatus including a holder for holding a disc cartridge, a chassis on which is rotatably mounted the holder, a supporting mechanism for rotatably supporting the holder relative to the chassis, and a limiting mechanism for limiting the amount of movement of the holder relative to the chassis, the supporting mechanism including a pair of shafts mounted on one of the chassis and the holder and a pair of receiving portions having engagement holes engaged by the shafts, one of the receiving portions having a cut-out formed in continuation to the associated engagement hole. The mounting method includes engaging the other shaft of the pair of shafts in the other of the engagement holes in an angular state larger than the rotational angle of the holder allowed to the chassis after mounting the holder on the chassis, subsequently engaging one shaft of the pair of shafts in one engagement hole of the pair of engagement holes, and subsequently rotating the holder in a direction of reducing an angle which the holder makes with the chassis for mounting the holder on the chassis.

DESCRIPTION OF THE PREFERRED EMBODIMENTS

Figure 1:
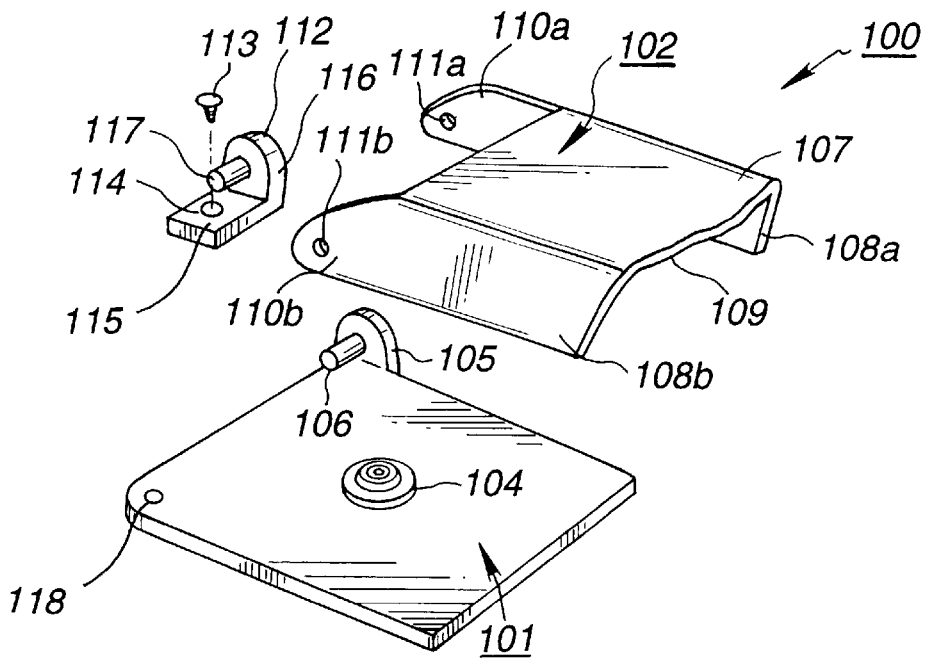
FIG. 1 is an exploded perspective view showing an example of a cartridge holder rotary mechanism as a prior art for the present invention.

Referring to the drawings, a preferred embodiment of the cartridge holder of the present invention will be explained in detail.

In the following description, an embodiment of the present invention applied to a cartridge holder device of a recording and/or reproducing apparatus employing a disc cartridge is explained.

Figure 3:
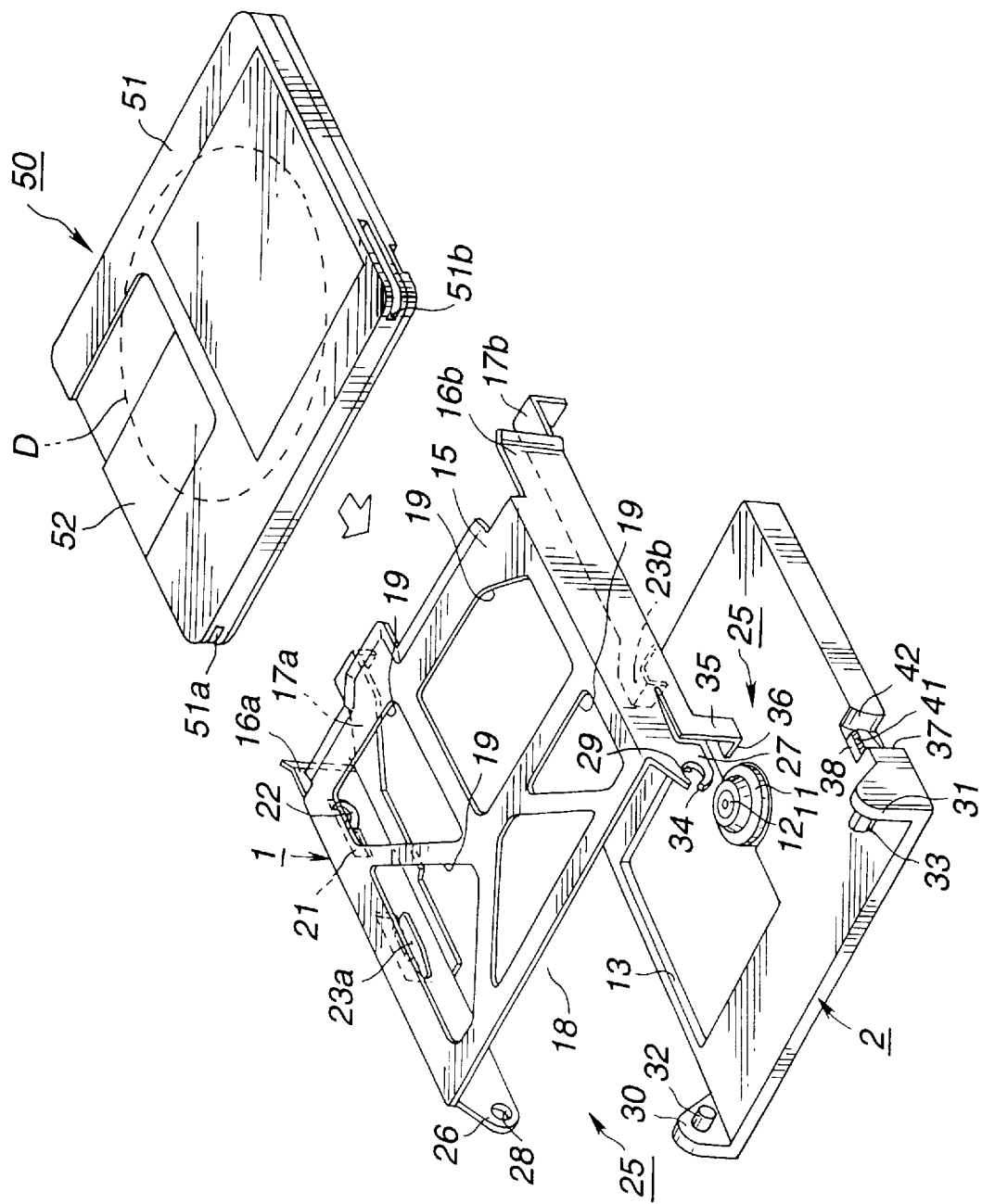
FIG. 3 is an exploded perspective view showing a cartridge holder rotary mechanism according to the present invention.
Figure 4:
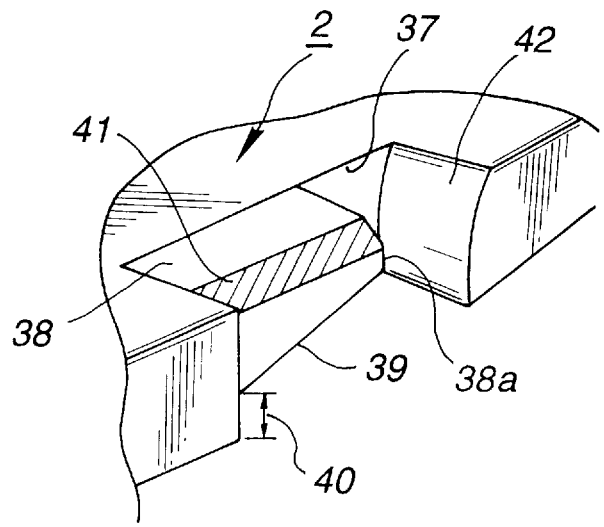
FIG. 4 is an enlarged perspective view showing essential portions of a chassis according to the present invention.

First, a disc cartridge 50 loaded on the cartridge holder device of the present embodiment is explained. The disc cartridge 50 has a main body portion of the cartridge 51 and a shutter 52, as shown in FIG. 3. Within the main body portion of the cartridge 51 is rotatably mounted an optical disc D such as a magneto-optical disc. At a mid portion on the lower surface of the main body portion of the cartridge 51 is formed a first circular aperture designed to permit a disc table as later explained to be introduced into the main body portion of the cartridge 51. In the upper and lower surfaces of the main body portion of the cartridge 51 are formed second and third apertures, not shown, for radiating a light beam from an optical pickup device mounted on a chassis, as later explained, so as to be illuminated on the optical disc D. The second and third apertures, formed for extending from the vicinity of the center to one of lateral surfaces of the main body portion of the cartridge 51, are adapted for being opened or closed by a shutter 52 formed of a metallic material, such as stainless steel, so as to have a U-shaped cross-section. The shutter 52 is mounted on the main body portion of the cartridge 51 for movement along the lateral surface of the main cartridge body portion 51. The shutter 52 is locked in a position of closing the above-mentioned second and third apertures by a lock member, not shown, arranged within the main cartridge body portion 51. The locked state of the shutter 52 by the lock member is released by a shutter opening member, as later explained, when inserting the disc cartridge 50 into the holder 1. In the lateral side of the main cartridge body portion 51, along which is moved the shutter 52, is formed a shutter opening groove 51a for extending along substantially the entire length of the lateral side of main cartridge body portion 51. Into the shutter opening groove 51a is intruded the shutter opening member for moving the shutter. In a lateral side of the main cartridge body portion 51 parallel to the lateral side thereof formed with the shutter opening groove is formed a mistaken insertion inhibiting grove 51b shorter in length than the shutter opening groove 51a. Thus, if the disc cartridge 50 is inserted into the cartridge holder 1 in an upside-down state, that is in a state reversed from the normal front side-reverse side relation, the shutter opening member is introduced into the mistaken insertion inhibiting grove 51b. When the disc cartridge 50 is inserted a pre-set distance into the holder 1, the shutter opening member is abutted against the inner end of the mistaken insertion inhibiting grove 51b to inhibit further insertion of the disc cartridge 50 into the cartridge holder 1.

The optical disc D, accommodated in the disc cartridge 50, constructed as described above, is a recordable disc, such as a magneto-optical disc, or a read-only optical disc. The optical disc D is of a diameter substantially equal to 64 mm and is of a thickness of 1.2 mm in a portion thereof illuminated by the light beam from the optical pickup device. A metallic plate for chucking, not shown, is mounted at a mid portion of the optical disc D. This metallic plate for chucking is attracted by a magnet, not shown, mounted on the disc table.

The cartridge holder 1, into which the disc cartridge 50 is inserted and held as described above, is rotated and moved between an upper position in which the holder 1 is spaced apart from the chassis 2 for insertion and ejection of the disc cartridge relative to the cartridge holder 1 and a lower position in which the holder approaches the chassis 2 with the disc cartridge 50 inserted and held in the holder 1 being positioned Ad by a positioning mechanism, not shown, of the chassis 2. The rotation of the cartridge holder 1 between the upper and lower positions is operatively linked with the opening/closure movement of the lid of the recording and/or reproducing apparatus.

The cartridge holder 1 is formed as a rectangle slightly larger than the plan configuration of the disc cartridge 50, as shown in FIG. 3. The cartridge holder 1, formed of a metallic material, such as stainless steel, has a major surface 15 facing the plane of the disc cartridge 50 and a pair of sidewall sections 16a, 16b substantially perpendicular to the major surface 15 on both opposite sides of the major surface 15. On the foremost parts of these sidewall sections 16a, 16b are formed a pair of holding portions 17a, 17b for extending parallel to the major surface 15. The major surface 15, sidewall sections 16a, 16b and the holding portions 17a, 17b limit movement of the disc cartridge 50 inserted into the cartridge holder 1 within a housing portion 18.

The major surface 15 of the cartridge holder 1 is formed with plural openings 19, as shown in FIG. 3. These openings 19 perform the role of permitting the disc cartridge 50 loaded into the recording and/or reproducing apparatus to be seen through a window formed in the outer casing on mounting the main cartridge body portion 1 on the outer casing constituting the main body portion of the apparatus as well as the role of reducing the weight of the cartridge holder 1. These openings 19 may also be used as mounting holes for mounting various components, such as magnetic head, for impressing the perpendicular magnetic field as an external magnetic field in case the optical disc D is a magneto-optical disc.

The sidewall sections 16a, 16b, formed on both opposite lateral sides of the major surface 15, are of a height slightly larger than the thickness of the loaded disc cartridge 50. The sidewall section 16a carries a shutter opening member 21. This shutter opening member 21 moves the shutter 52 of the disc cartridge 50 inserted into the cartridge holder 1 when the disc cartridge 50 is inserted into the cartridge holder 1 for opening the second and third apertures. That is, when the disc cartridge 50 is inserted into the cartridge holder 1, the shutter 52 is engaged by a lug 22 of the shutter opening member 21. As the disc cartridge 50 is inserted further into the cartridge holder 1, the shutter 52 is moved for further opening the second and third openings of the disc cartridge 50. At this time, the shutter opening member 21 acts on a lock member provided on the disc cartridge 50 for releasing the lock of the shutter 52 by the lock member.

On the sidewall sections 16a, 16b of the cartridge holder 1 are formed position setting pieces 23a, 23b for extending parallel to the major surface 15. When the disc cartridge 50 is inserted into the cartridge holder 1, the position setting pieces 23a, 23b are engaged in grooves 51a, 51b formed in the lateral sides of the disc cartridge 50. By the position setting pieces 23a, 23b being engaged in grooves 51a, 51b of the disc cartridge 50, the inserting position of the holder 1 of the disc cartridge 50 into the cartridge holder 18 of the holder 1 is set, at the same time as the position of the disc cartridge 50 housed within the housing portion 18 is set.

The cartridge holder 1, thus constructed, is rotatably mounded on the chassis 2 by a rotary mechanism 25. That is, the rotary mechanism 25 includes projecting pieces 26, 27 formed at one ends of the sidewall sections 16a, 16b of the cartridge holder 1, a first hole 28 formed in the projecting piece 26, a second hole 29 formed in the opposite side projecting piece 27, semi-arcuately shaped supporting pieces 30, 31 formed upright on one lateral edge of the chassis 2 and shafts 32, 33 formed protuberantly on the supporting pieces 30, 31. The projecting pieces 26, 27 are projected beyond the top plate 15 along the inserting direction of the disc cartridge 50 from the sidewall sections 16a, 16b in parallel with each other. The first hole 28 is formed at a mid portion of the projecting piece 26, while the second hole 29 is formed at a mid portion of the projecting piece 27. The projecting piece 27 is partially cut out in the horizontal direction for forming a cut-out 34. The second hole 29 communicates with the cut-out 34. The width of the cut-out 34 is larger than the length in the short-axis direction of the second shaft 33 and smaller than the length in the long axis of the second shaft 33.

The supporting pieces 30, 31 provided on the chassis 2, are formed with first and second shafts 32, 33 engaged respectively with the first and second holes 28, 29. The first shaft 32 has a circular transverse cross-section. The first shaft 32 is formed so as to be slightly smaller in diameter than the first hole 28 of the cartridge holder 1. The second shaft 33 formed on the supporting piece 31 has an elliptical cross-section and has a width along the short axis of the ellipsis substantially equal to the opening width of the cut-out 34 of the second hole 29 and a width along the long axis of the ellipsis slightly larger than the width of the cut-out 34 and slightly smaller than the diameter of the second hole 29. The second shaft 29 is arranged so that the long axis is perpendicular to a reception surface for the optical disc D of the disc table arranged on the chassis 2.

Figure 6:
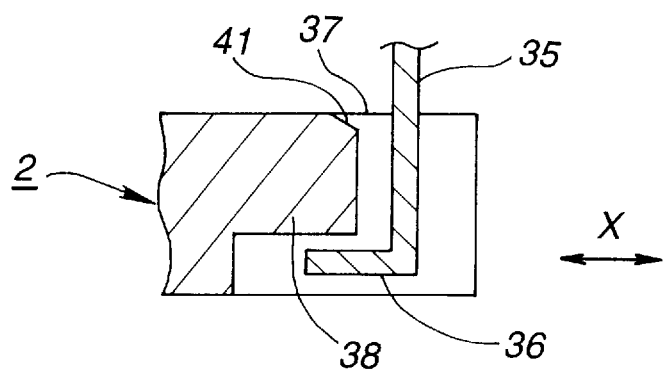
FIG. 6 is a schematic cross-sectional view showing the state of engagement between a retainer and an elastic piece.

The cartridge holder 1 is formed with an elastic piece 35 protruded downwards from the projecting piece 27 formed on the opposite sidewall section 16b. The elastic piece 35 is chevron-shaped as a whole and is formed so as to be flush with the sidewall section 16b. The elastic piece 35 is elastically deformed in a direction normal to the inserting direction of the disc cartridge 50 as indicated by arrow X in FIG. 6. The elastic piece 35 has its end portion formed with a control portion 36 extending parallel to the major surface 15 of the cartridge holder 1, as shown in FIGS.3 and 6. This control portion 36 is formed for being protruded downwards from the opposite sidewall section 16b. This control portion 36 is retained by a retainer 38 formed on a lateral edge of the chassis 2 as later explained.

The lateral side of the chassis 2 formed with the supporting piece 31 is formed with a cut-out 37 extending through the entire thickness of the chassis 2. Into this cut-out is intruded the elastic piece 35 when mounting the cartridge holder 1 on the chassis 2.

In the cut-out 37 is formed the retainer 38 so that its upper surface will be flush with the upper surface of the chassis 2 on which is mounted the disc table 11. The retainer 38 retains the control portion 36 of the elastic piece 35 of the cartridge holder 1. The cut-out 37 is formed with a lower inclined surface 39 approaching the supporting piece 31. There is formed a clearance 40 between the retainer 38 and the surface of the chassis 2 on which the disc table 11 of the chassis 2 is not set, that is the bottom surface of the chassis 2. The inclined surface 39 and the clearance 40 set the amount of rotation of the cartridge holder 1 relative to the chassis 2, that is the angle of rotation, after the cartridge holder 1 is rotated towards the above-mentioned lower position, the control portion 36 of the elastic piece 35 is retained by the retainer 38 and the cartridge holder 1 is mounted on the chassis 2.

The end of the surface of the retainer 38 not formed with the inclined surface 39, that is the surface on which is set the disc table 11, is formed with an inclined portion 41. The role of the inclined portion 41 is to facilitate elastic displacement of the elastic piece 35 in the direction indicated by arrow X in FIG. 6 when mounting the cartridge holder 1 on the chassis 2. The peripheral wall facing an end 38a of the retainer 38 within the cut-out 37 is formed a protrusion 42 which is arcuately shaped for being extended towards the inside of the cut-out 37. The protrusion 42 controls, in cooperation with the inclined surface 39 and the clearance 40, the amount of rotation, that is the rotational angle, of the cartridge holder 1, by abutment of the control portion 36 against the inclined surface 39 or the protrusion 42, when the cartridge holder 1 is mounted on the chassis 2 and subsequently the cartridge holder 1 is rotated towards tits upper position.

The chassis 2, on which the cartridge holder 1 is rotatably mounted by the rotary mechanism as described above, is formed as a rectangle slightly larger than in plan configuration than the disc cartridge 50. At a mid portion on the upper surface of the chassis 2 is mounted the disc table 11 rotationally driven by a motor, not shown. Within the disc table 11 is arranged a magnet configured for magnetically attracting a metallic plate mounted on a mid region of the optical disc D housed within the disc cartridge 50. At a mid portion of the disc table 11 is mounted a convex-shaped centering portion 12. Thus, by the centering portion 12 engaged in the center opening of the optical disc D housed within the disc cartridge 50 inserted into the cartridge holder 1, the optical disc D is centered, while the metallic plate of the optical disc D is attracted by the magnet arranged on the disc table 11 for chucking the optical disc D by the disc table 11. The disc table 11 is then run in rotation by a motor, not shown, for running the optical disc D in rotation.

The chassis 2 is formed with an aperture 13 for the optical pickup for neighboring to the disc table 11. This aperture for the optical pickup 13 permits the optical pickup device, not shown, to face the outside of the chassis 2. This optical pickup device illuminates a laser beam on a signal recording surface of the optical disc D of the disc cartridge 50 loaded on the cartridge holder 1 for reading out information signals, such as speech signals, recorded on the optical disc D. Thus the aperture for the optical pickup 13 is formed so as to be slightly larger than the second and third openings of the disc cartridge 50 and so as to be coextensive with the area of movement of the optical pickup device in order to permit the optical pickup device to illuminate the laser beam on the entire signal recording area of the optical disc D exposed by the second and third openings of the disc cartridge 50.

The upper surface of the chassis 2 includes a positioning mechanism, not shown, for the disc cartridge 50. When the cartridge holder 1 is rotated to its lower position by this positioning mechanism, the disc cartridge 50 held by the in cartridge holder 1 is positioned by this positioning mechanism act relative to the chassis 2.

Figure 5:
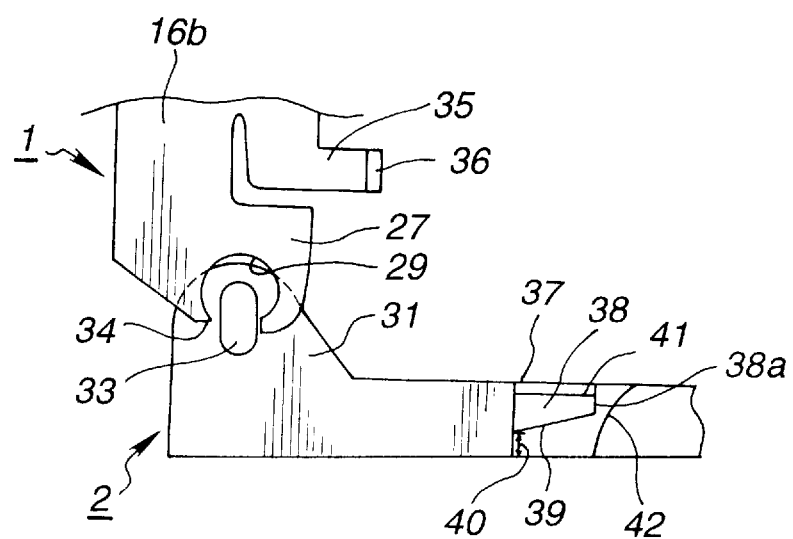
FIG. 5 is a schematic side view showing the mounting state ant of a cartridge holder according to the present invention.

The cartridge holder 1 is mounted on the chassis as follows: The cartridge holder 1 is positioned so that it is perpendicular to the chassis 2, as shown in FIG. 5. The state in which the cartridge holder 1 is perpendicular to the chassis 2 is such a state in which, after mounting the cartridge holder 1 on the chassis 2, the cartridge holder 1 is deviated from the regular rotational area between the upper and lower positions, that is from the regular range of rotational angle, as shown in FIG. 5.

The first shaft 32 provided on the supporting piece 30 of the chassis 2 is engaged in the first hole 28 formed in the projecting piece 26 of the cartridge holder 1. The second shaft 33 of the supporting piece 31 of the chassis 2 is engaged in the second hole 29 formed in the projecting piece 27 via cut-out 34 from a direction normal to the chassis 2. The opening width of the cut-out 34 formed in the second hole 29 is selected to be substantially equal to the diameter along the short axis of the second shaft 33 having an elliptical cross-section. Thus the cartridge holder 1 can be mounted on the chassis 2 only from the direction normal thereto.

Figure 7:
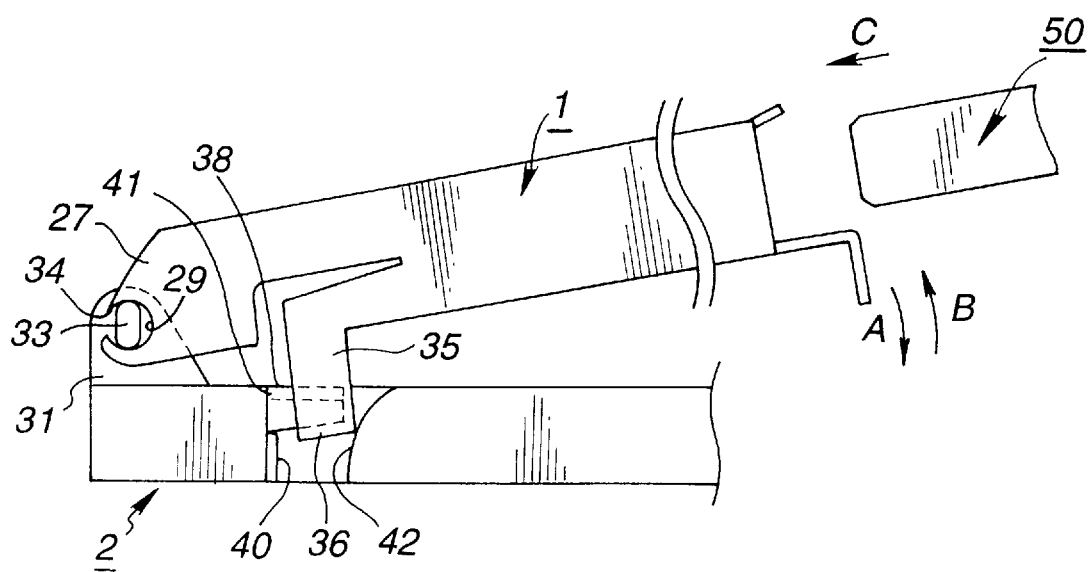
FIG. 7 illustrates the rotary operation of the cartridge holder according to the present invention.

After the first and second shafts 32, 33 of the chassis 2 are engaged in the first and second holes 28, 29, respectively, the cartridge holder 1 is rotated in the closing direction, that is in a direction indicated by arrow A in FIG. 7. When the cartridge holder 1 is rotated in the closing direction, the control portion 36 of the elastic piece 35 is abutted against the retainer 38 of the chassis 2. At this time, the elastic piece 35 is elastically displaced in a direction of arrow X in FIG. 6, that is towards right in FIG. 6, by the inclined portion 41 formed on the outer side of the retainer 38. On further rotation of the cartridge holder 1, the elastic piece 35 is elastically restored in a direction indicated by arrow X in FIG. 6, that is towards left in FIG. 6. Thus the control portion 36 rides over the retainer 38 so as to be positioned below the retainer 38. If the control portion 36 is positioned below the retainer 38, as shown in FIG. 6, it becomes difficult for the control portion 36 to ride over the retainer 38 to disengage the elastic piece 35 from the retainer 38, because the control portion 36 is substantially perpendicular to the elastic piece 35 and the retainer 38 has substantially the right-angled cross-section. The operation of mounting the holder 1 on the chassis 2 is completed when the holder 1 is rotated to a state in which the elastic piece 35 is engaged with the retainer 38.

The cartridge holder 1, thus mounted in position, is moved to its upper position or to its lower position on being rotated in a direction indicated by arrow B or in a direction indicated by arrow A in FIG. 7, respectively. With the holder 1 in the upper open position, as shown in FIG. 7, the disc cartridge 50 is inserted from the direction shown by arrow C in FIG. 7. When the cartridge holder 1 is rotated in the direction indicated by arrow B in FIG. 7, the control portion 36 of the elastic piece 35 is engaged with the retainer 38 of the cut-out 37 on the chassis 2. Thus the range of rotation until the control portion 36 of the elastic piece 35 is retained by the retainer 38 represents a regular range of rotation, such that the cartridge holder 1 is rotated until the control portion 36 is retained by the inclined surface 39 of the retainer 38. The rotational direction of the cartridge holder 1 is similarly controlled by the retainer 38 being abutted against the protrusion 42 of the cut-out 37 at a pre-set position. The cut-out 34 is formed in the projecting piece 27 for mounting the holder 1, as described above. However, since the width along the long axis direction of the second shaft 33 of the chassis 2 having the elliptical cross-section is selected to be larger than the opening width of the cut-out 34, there is no risk of the holder 1 becoming disengaged from the shaft 33 in the course of rotation of the holder 1 in the direction indicated by arrow A or arrow B in FIG. 7. It is because the range of rotation of the cartridge holder 1 is limited by the control portion 36 of the elastic piece 35 being engaged with the retainer 38. Since the cartridge holder 1 cannot be rotated to a state in which the holder 1 is perpendicular to the chassis 2 to enable detachment of the holder 1 from the chassis 2, the holder 1 cannot be detached from the chassis 2.

If, with the cartridge holder 1 having been rotated in the direction of arrow B in FIG. 7, the disc cartridge 50 is inserted from the direction shown by arrow C in FIG. 7 as far as the regular position in the holder 1, the holder 1 is rotated in the direction indicated by arrow A in FIG. 7. When the cartridge holder 1 is rotated in the direction indicated by arrow A in FIG. 7 so that it is moved to the lower position approaching the chassis 2, the disc cartridge 50 held by the holder 1 is positioned by the positioning mechanism, not shown, provided in the chassis 2. Simultaneously, the optical disc D within the disc cartridge 50 is chucked on the disc table 11, with the center opening of the disc D being centered by the centering portion 12.

For taking out the disc cartridge 50 from the cartridge holder 1, it suffices to rotate the holder 1 again in the direction shown by arrow B in FIG. 7.

Figure 2:
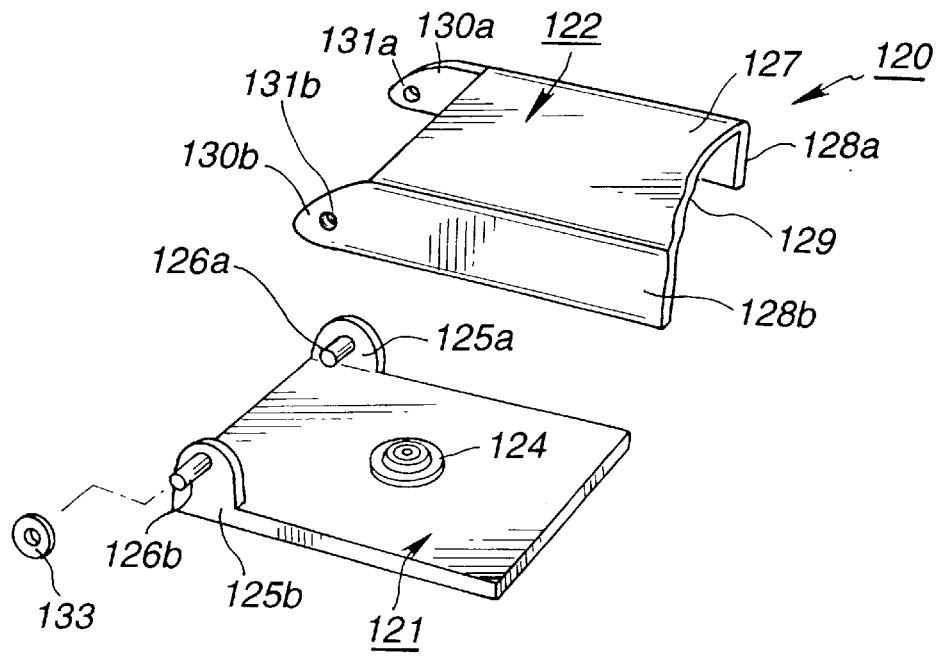
FIG. 2 is an exploded perspective view showing another example of a cartridge holder rotary mechanism as a prior art for the present invention.

In the holding apparatus for the disc cartridge, described above, the number of component parts can be reduced as compared to that of the rotary mechanism for the holder shown in FIGS. 1 and 2, thus reducing the assembling time and improving the production efficiency. The overall error after assembling of the rotary mechanism 25 for the cartridge holder 1 can be reduced thus enabling the cartridge holder 1 to be assembled correctly to the chassis 2.

The present invention is not limited to the above-described illustrative embodiments but may encompass various modifications. Although the rotary mechanism for the cartridge holder in the above-described embodiment is designed so that the holes and shafts are provided in the cartridge holder and the chassis, respectively, the rotary mechanism for the cartridge holder may also be designed so that the holes and shafts are provided in the chassis and in the cartridge holder, respectively.

The cartridge holder is not limited to the disc cartridge but may also be applied to a rotary mechanism or device for a holder for a tape cartridge housing a tape such as a magnetic tape.

With the holder apparatus according to the present invention, the cartridge holder is mounted on the chassis by first fitting the first shaft in the first hole and by introducing and engaging the second shaft in the cut-out of the second hole, the cartridge holder can be mounted easily on the chassis. In addition, the number of component parts can be reduced thus improving the production efficiency and reducing production cost. According to the present invention, the number of components and hence the component parts as a reference at the time of mounting the cartridge holder on the chassis can be reduced, thereby improving mounting precision in mounting the cartridge holder on the chassis.

What is claimed is:

1. A holder apparatus comprising:
   a holder for holding a disc cartridge;
   a chassis on which said holder is rotatably mounted; and
   a supporting mechanism for rotatably supporting said holder relative to said chassis, said supporting mechanism including:
      first and second shafts mounted on one of said chassis and said holder, and
      first and second receiving portions formed on the other of said chassis and said holder, said first receiving portion having a first engagement hole for engaging with said first shaft and said second receiving portion having a second engagement hole for engaging with said second shaft, said second engagement portion having a cut-out formed in continuation to said second engagement hole;
   wherein said second shaft has an elliptical cross-section with a width that is smaller than a width of said cut-out and a length that is greater than the width of said cut-out, and wherein said supporting mechanism rotatably mounts said holder on said chassis by engaging said first shaft in said first hole and engaging said second shaft in said second hole via said cut-out.

2. The holder apparatus as claimed in claim 1 wherein the second shaft is engageable with said second hole via said cut-out only when the holder is rotated to a predetermined rotational position such that the second shaft width is aligned to the cut-out width.

3. The holder apparatus as claimed in claim 2 wherein said supporting mechanism has a limiting mechanism for selectively preventing rotation of said holder to the predetermined rotational position relative to said chassis.

4. The holder apparatus as claimed in claim 3 wherein said limiting mechanism includes an engagement piece provided in one of the holder and the chassis and a retainer provided on the other of the holder and the chassis, said retainer engages with said engagement piece for preventing the rotation of the holder to the predetermined rotational position.

5. A method for mounting a holder in a holder apparatus, said holder apparatus including a holder for holding a disc cartridge, a chassis on which said holder is rotatably mounted, a supporting mechanism for rotatably supporting said holder relative to said chassis, and a limiting mechanism for limiting an amount of rotation of the holder relative to the chassis, said supporting mechanism including first and second shafts mounted on one of said chassis and the holder and first and second receiving portions formed on the other of said chassis and the holder having first and second engagement holes for engaging said first and second shafts respectively, said second receiving portion having a cut-out formed in continuation to the second engagement hole, said second shaft having an elliptical cross-section with a width that is smaller than a width of said cut-out and a length that is greater than the width of said cut-out; said mounting method comprising:
   engaging the first shaft in said first engagement hole;
   subsequently engaging said second shaft in said second engagement hole via said cut-out with the holder positioned in a predetermined rotational position; and
   subsequently rotating said holder in a direction away from the predetermined rotational position.

6. The method for mounting a holder in a holder apparatus as claimed in claim 5 wherein after the rotation of the holder away from the predetermined rotational position, said limiting mechanism limits rotation of the holder relative to the chassis to prevent the holder from rotating back to the predetermined rotational position.

7. A holder apparatus comprising:
   a chassis; and
   a holder for holding a cartridge, the holder being rotatably mounted to the chassis by a supporting mechanism that includes:
      first and second receiving portions formed on one of the chassis and the holder, the first receiving portion having a first engagement hole and the second receiving portion having a second engagement hole, the second receiving portion having a cut-out formed in continuation to the second engagement hole, and
      first and second shafts mounted on the other of the chassis and the holder for engagement with the first and second engagement holes respectively, the second shaft has an elliptical cross-section with a width that is smaller than a width of the cut-out and a length that is greater than the width of the cut-out;
   wherein the supporting mechanism rotatably mounts the holder on the chassis by engaging the first shaft in the first hole and engaging the second shaft in the second hole via the cut-out.

8. The holder apparatus of claim 7 wherein the second shaft is engageable with the second hole via the cut-out only when the holder is positioned in a predetermined rotational position so that the second shaft width is aligned to the cut-out width.

9. The holder apparatus as claimed in claim 8, further comprising: a limiting mechanism for selectively limiting rotation of the holder.

10. The holder apparatus as claimed in claim 9, wherein the limiting mechanism includes an engagement piece provided in one of the holder and the chassis and a retainer provided on the other of the holder and the chassis such that the retainer engages with the engagement piece to prevent the holder from rotating to the predetermined rotational position.

* * * * *